(12) United States Patent
Yoon et al.

(10) Patent No.: US 11,383,816 B2
(45) Date of Patent: Jul. 12, 2022

(54) BALLAST WATER TREATMENT SYSTEM AND METHOD OF DRIVING THE SAME

(71) Applicant: NK CO., LTD., Busan (KR)

(72) Inventors: Seung Je Yoon, Busan (KR); Mi Hyun Oh, Busan (KR); Han Gong Kim, Busan (KR)

(73) Assignee: NK CO., LTD., Busan (KR)

( * ) Notice: Subject to any disclaimer, the term of this patent is extended or adjusted under 35 U.S.C. 154(b) by 0 days.

(21) Appl. No.: 16/758,282

(22) PCT Filed: Jul. 13, 2018

(86) PCT No.: PCT/KR2018/007946
§ 371 (c)(1),
(2) Date: Apr. 22, 2020

(87) PCT Pub. No.: WO2019/083127
PCT Pub. Date: May 2, 2009

(65) Prior Publication Data
US 2020/0317317 A1    Oct. 8, 2020

(30) Foreign Application Priority Data
Oct. 23, 2017    (KR) .................. 10-2017-0137724

(51) Int. Cl.
*B63J 4/00*  (2006.01)
*C02F 1/00*  (2006.01)
(Continued)

(52) U.S. Cl.
CPC .............. *B63J 4/002* (2013.01); *C02F 1/008* (2013.01); *C02F 1/78* (2013.01);
(Continued)

(58) Field of Classification Search
None
See application file for complete search history.

(56) References Cited

U.S. PATENT DOCUMENTS

2006/0243673 A1* 11/2006 van Leeuwen .......... C02F 1/78
                                                210/760
2010/0006490 A1*  1/2010 Fukuyo .................... B63J 4/004
                                                210/170.11
(Continued)

FOREIGN PATENT DOCUMENTS

KR    10-2007-0102626 A    10/2007
KR       10-0769834 B1    10/2007
(Continued)

OTHER PUBLICATIONS

Notice of Allowance issued from Korean Patent Application No. 10-2017-0137724 dated Oct. 24, 2018.
(Continued)

*Primary Examiner* — Richard C Gurtowski
(74) *Attorney, Agent, or Firm* — Sughrue Mion, PLLC (57) ABSTRACT

The present invention relates to a ballast water treatment system including an air compressor for compressing air; an air receiver tank for receiving the compressed air from the air compressor and storing the compressed air; an oxygen generator for generating oxygen from the air supplied from the air receiver tank; an oxygen receiver tank for storing the oxygen supplied from the oxygen generator; an ozone generator for generating ozone from the oxygen supplied from the oxygen receiver tank; a ballast water pump for pumping ballast water; an inflow line for transferring the ballast water from the ballast water pump; a ballast water tank for receiving the ballast water from the inflow line and storing the ballast water; and an ozone injector for injecting the ozone into the ballast water of the inflow line.

15 Claims, 6 Drawing Sheets

(51) Int. Cl.
 _C02F 1/78_ (2006.01)
 _C02F 103/00_ (2006.01)
(52) U.S. Cl.
 CPC .. _C02F 2103/008_ (2013.01); _C02F 2201/782_ (2013.01); _C02F 2209/005_ (2013.01); _C02F 2209/03_ (2013.01); _C02F 2209/40_ (2013.01)

(56) References Cited

U.S. PATENT DOCUMENTS

2010/0181260 A1* 7/2010 Vroom .................... B63B 13/00
 210/748.03
2015/0068365 A1* 3/2015 Golden ................... C01B 13/10
 75/631

FOREIGN PATENT DOCUMENTS

| KR | 10-0802889 B1 | 2/2008 |
| KR | 10-1050396 B1 | 7/2011 |
| KR | 10-1468928 B1 | 12/2014 |
| KR | 10-1564244 B1 | 10/2015 |
| KR | 10-2016-0064453 A | 6/2016 |

OTHER PUBLICATIONS

International Search Report for PCT/KR2018/007946 dated Oct. 16, 2018 (PCT/ISA/210).

\* cited by examiner

BALLAST WATER TREATMENT SYSTEM AND METHOD OF DRIVING THE SAME

CROSS-REFERENCE TO RELATED APPLICATION

This application is a National Stage Entry of PCT International Application No. PCT/KR2018/007946, which was filed on Jul. 13, 2018, and which claims priority to Korean Patent Application No. 10-2017-0137724, filed on Oct. 23, 2017 in the Korean Intellectual Property Office, the disclosure of which is incorporated herein by reference.

TECHNICAL FIELD

The present invention relates to a ballast water treatment system and a method of driving the same, and more particularly, to a ballast water treatment system that enables efficient and safe ozone management and a method of driving the same.

BACKGROUND ART

In general, ballast water refers to freshwater or seawater for buoyancy adjustment that is filled in ballast tanks formed on both sides of the bottom of a ship to maintain the balance of the ship. Since freshwater or seawater used as ballast water contains various organisms such as pathogens and plankton, discharging ballast water into coastal regions without any treatment may lead to serious marine pollution and destruction of ecosystems.

Based on this situation, in 1996, in the United States, by establishing the national invasive species law, exotic species were defined as invaders and the management and control of ballast water became mandatory. In addition, in Australia, the quarantine law was amended. In accordance with the amendments, ballast water is defined as imported cargo subject to quarantine, and direct quarantine is conducted on ballast water. In addition, the International Maritime Organization (IMO) concluded an international agreement in February 2004. According to this agreement, a ship must be equipped with necessary equipment to sterilize ballast water starting in 2009, and in case of violation, the ship is completely prohibited from entering.

In recent years, the interest of countries around the world in preventing environmental pollution has increased. Furthermore, national efforts and regulations to prevent environmental pollution will be further strengthened in the future. Accordingly, in addition to treatment of ballast water, methods of economically and safely treating, in a ship, various wastewater or harmful gases generated during ship operation have been studied.

RELATED ART DOCUMENT

Patent Document

Korean Patent No. 10-0769834

DISCLOSURE

Technical Problem

Therefore, the present invention has been made in view of the above problems, and it is one object of the present invention to provide a ballast water treatment system that enables efficient and safe ozone management.

It is another object of the present invention to provide a method of driving the ballast water treatment system.

Technical Solution

In accordance with one aspect of the present invention, provided is a ballast water treatment system including an air compressor for compressing air; an air receiver tank for receiving the compressed air from the air compressor and storing the compressed air; an oxygen generator for generating oxygen from the air supplied from the air receiver tank; an oxygen receiver tank for storing the oxygen supplied from the oxygen generator; an ozone generator for generating ozone from the oxygen supplied from the oxygen receiver tank; a ballast water pump for pumping ballast water; an inflow line for transferring the ballast water from the ballast water pump; a ballast water tank for receiving the ballast water from the inflow line and storing the ballast water; and an ozone injector for injecting the ozone into the ballast water of the inflow line.

In one embodiment of the present invention, the ballast water treatment system may further include a first pressure gauge for measuring a pressure of a fluid output from the air receiver tank; a second pressure gauge for measuring a pressure of a fluid output from the oxygen receiver tank; and a third pressure gauge for measuring a pressure of a fluid output from the ozone generator.

In one embodiment of the present invention, the ballast water treatment system may further include an ozone generator gas valve for controlling a flow rate of the oxygen supplied from the oxygen receiver tank to the ozone generator; a bypass valve for controlling a flow rate of an ozone generator bypass line that sends the oxygen supplied from the oxygen receiver tank to an output terminal of the ozone generator so that the oxygen bypasses the ozone generator; and an ozone output valve for controlling a flow rate of the ozone generated in the ozone generator.

In one embodiment of the present invention, the ballast water treatment system may further include a controller for receiving pressure signals measured in the first to third pressure gauges and controlling opening and closing of the ozone generator gas valve, the bypass valve, and the ozone output valve.

In one embodiment of the present invention, the ballast water treatment system may further include a discharge line for discharging the ballast water stored in the ballast water tank; and a neutralization device for supplying a neutralizing agent to the discharge line to neutralize residual active materials contained in the ballast water discharged through the discharge line.

In one embodiment of the present invention, the ballast water treatment system may further include a filter for seawater installed in the inflow line to purify the ballast water supplied from the ballast water pump.

In accordance with another aspect of the present invention, provided is a method of driving a ballast water treatment system including an air compressor for compressing air; an air receiver tank for storing the compressed air; an oxygen generator for generating oxygen from the air; an oxygen receiver tank for storing the oxygen; an ozone generator for generating ozone from the oxygen; a ballast water pump for pumping ballast water; an inflow line for transferring the ballast water; an ozone injector for injecting the ozone into the inflow line; and a fan for ventilating surroundings of the components, the method including a step of checking operation of the fan; a step of testing an output pressure of the ozone generator using the oxygen (initial pressure test step); a step of generating ozone using the ozone generator (ballast water warm-up step); a step of notifying that the ozone is ready to be injected into the ballast water (preparation signal generation step); and a step of injecting the ozone into the ballast water of the inflow line (ozone injection step).

In one embodiment of the present invention, the ballast water treatment system may further include a first pressure gauge for measuring a pressure of a fluid output from the air receiver tank; a second pressure gauge for measuring a pressure of a fluid output from the oxygen receiver tank; a third pressure gauge for measuring a pressure of a fluid output from the ozone generator; an ozone generator gas valve for controlling a flow rate of the oxygen supplied from the oxygen receiver tank to the ozone generator; and an ozone output valve for controlling a flow rate of the ozone supplied from the ozone generator to the inflow line. The initial pressure test step may further include a step of operating the air compressor and measuring, using the first pressure gauge, a first (a) pressure of the air output from the air receiver tank; a step of operating the oxygen generator and measuring, using the second pressure gauge, a second (a) pressure of the oxygen output from the oxygen receiver tank; a step of removing moisture of the oxygen (moisture removal step); a step of opening the ozone output valve but not operating the ozone generator, and measuring, using the third pressure gauge, a third pressure of the oxygen passing through the ozone generator and output from the ozone generator; a step of closing the ozone generator gas valve and measuring, using the second pressure gauge, a second (b) pressure of the oxygen output from the oxygen receiver tank; and a step of stopping the oxygen generator and measuring a first (b) pressure of the air output from the air receiver tank.

In one embodiment of the present invention, only when values of the first (a) pressure, the second (a) pressure, the third pressure, the second (b) pressure, and the first (b) pressure respectively are within a preset range, the initial pressure test step may be completed, and the ballast water warm-up step, which a subsequent step, may be performed.

In one embodiment of the present invention, the preset range of the first (a) pressure and the preset range of the first (b) pressure may be identical to each other, the preset range of the second (a) pressure and the preset range of the second (b) pressure may be identical to each other, the preset range of the first (a) pressure may be greater than the preset range of the second (a) pressure, and the preset range of the second (a) pressure may be greater than the preset range of the third pressure.

In one embodiment of the present invention, the ballast water treatment system may further include a bypass valve for controlling the flow rate of an ozone generator bypass line that sends oxygen supplied from the oxygen receiver tank to an output terminal of the ozone generator so that the oxygen bypasses the ozone generator. The moisture removal step may include a step of opening the bypass valve; a step of allowing the oxygen to flow into the bypass line and lowering a dew point to condense moisture of the oxygen (dew point lowering step); and a step of opening the ozone generator gas valve and closing the bypass valve.

In one embodiment of the present invention, the ballast water warm-up step may include a step of operating the air compressor and measuring, using the first pressure gauge, a first pressure of the air output from the air receiver tank; a step of operating the oxygen generator and measuring, using the second pressure gauge, a second pressure of the oxygen output from the oxygen receiver tank; a step of preparing operation of the ozone generator; and a step of operating the ozone generator and measuring a concentration of the ozone output from the ozone generator.

In one embodiment of the present invention, the step of preparing may include a step of opening the bypass valve; a step of opening the ozone output valve; a step of measuring a concentration of the oxygen passing through the bypass line and a dew point; and a step of opening the ozone generator gas valve and closing the bypass valve.

In one embodiment of the present invention, only when measured values of the first pressure, the second pressure, the concentration of the oxygen, and the dew point are respectively within a preset range, each subsequent step may be performed.

In one embodiment of the present invention, the preset range of the first pressure may be greater than the preset range of the second pressure, the present range of the oxygen concentration may be 85% or more, and the present range of the dew point may be $-40°$ C. or less.

In one embodiment of the present invention, an amount of the ozone injected into the ballast water may be maintained at 2.2 ppm to 2.5 ppm.

In one embodiment of the present invention, the ballast water treatment system may further include a ballast water tank for receiving ballast water from the inflow line and storing the ballast water, a discharge line for discharging the ballast water stored in the ballast water tank, and a neutralization device for providing a neutralizing agent to the discharge line. The driving method may further include a step of supplying the neutralizing agent to the discharge line to neutralize residual active materials contained in the ballast water discharged through the discharge line.

In one embodiment of the present invention, the ballast water treatment system may further include a filter for seawater installed in the inflow line. The method of driving a ballast water treatment system may further include, before the ozone injection step, a step of purifying, using the filter for seawater, the ballast water supplied from the ballast water pump.

Advantageous Effects

According to embodiments of the present invention, a ballast water treatment system of the present invention includes an air compressor, an air receiver tank, an oxygen generator, an oxygen receiver tank, an ozone generator, a ballast water pump, an inflow line, a ballast water tank, and an ozone injector. A method of driving the ballast water treatment system according to the present invention includes a step of checking operation of a fan, an initial pressure test step, a ballast water warm-up step, a preparation signal generation step, and a step of injecting ozone into ballast water of the inflow line (ozone injection step). When a specific condition is not satisfied in each step, a subsequent step for each step is not performed. Accordingly, efficient and safe ozone management can be possible.

In addition, the pressure of a specific location, a dew point, and the like are measured. Based on the measured results, only when the measured results are within a preset range, subsequent steps are performed, and ozone is generated. Accordingly, outflow of harmful ozone gas can be prevented.

However, the effects of the present invention are not limited to the above-described effects, and may be broadly extended without departing from the spirit and scope of the present invention.

BEST MODE

Hereinafter, preferred embodiments of the present invention will be described in detail with reference to the accompanying drawings.

Since the present invention may be applied with various modifications and may have various embodiments, exemplary embodiments and drawings of the present invention are intended to be explained and exemplified. However, these exemplary embodiments and drawings are not intended to limit the embodiments of the present invention to particular modes of practice, and all changes, equivalents, and substitutes that do not depart from the spirit and technical scope of the present invention should be understood as being encompassed in the present invention.

Figure 1:
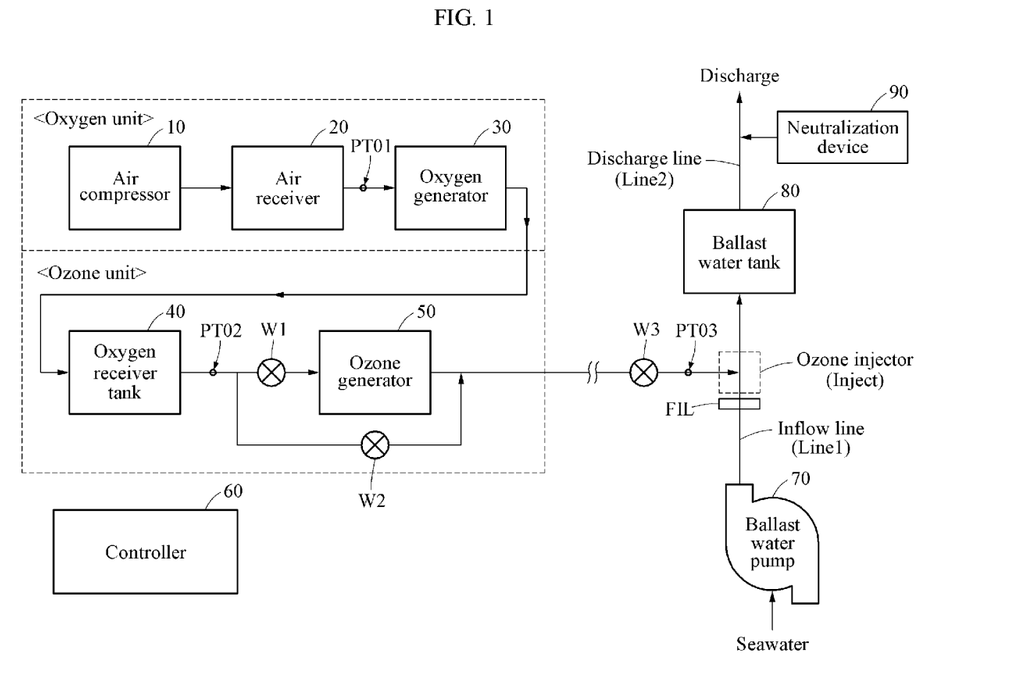
FIG. 1 is a block diagram showing a ballast water treatment system according to one embodiment of the present invention.

FIG. 1 is a block diagram showing a ballast water treatment system according to one embodiment of the present invention.

Referring to FIG. 1, the ballast water treatment system may include an air compressor 10, an air receiver tank 20, an oxygen generator 30, an oxygen receiver tank 40, an ozone generator 50, a controller 60, a ballast water pump 70, a ballast water tank 80, a neutralization device 90, an ozone injector (INJECT), an inflow line (LINE1), and a discharge line (LINE2).

The ballast water treatment system may further include a first pressure gauge (PT01), a second pressure gauge (PT02), a third pressure gauge (PT03), an ozone generator gas valve (VV1), a bypass valve (VV2), and an ozone output valve (VV3).

The air compressor 10 may compress air. The configuration of the air compressor 10 is not shown in detail, but the air compressor 10 may be provided with a dryer to remove moisture contained in the compressed air.

The air receiver tank 20 may receive compressed air from the air compressor 10 through an air line and store the compressed air. In this case, the air receiver tank 20 may be provided in singular or plural.

The oxygen generator 30 generates oxygen from air introduced from the air receiver tank 20. The oxygen generator 30 may be provided with compressed air through an air line installed between the oxygen generator 30 and the air receiver tank 20. The first pressure gauge (PT01) may be installed in the air line between the air receiver tank 20 and the oxygen generator 30. The first pressure gauge (PT01) may measure the pressure of a fluid output from the air receiver tank 20.

The air compressor 10, the air receiver tank 20, and the oxygen generator 30 may constitute a modular oxygen unit.

The oxygen receiver tank 40 may be connected to the oxygen generator 30 of the oxygen unit, and may store introduced oxygen. The stored oxygen may be introduced into the ozone generator 50 through an oxygen line connecting the oxygen receiver tank 40 and the ozone generator 50.

The second pressure gauge (PT02) may be installed in the oxygen line between the oxygen receiver tank 40 and the ozone generator 50. The second pressure gauge (PT02) may measure the pressure of a fluid output from the oxygen receiver tank 40.

The ozone generator 50 may generate ozone from oxygen introduced from the oxygen receiver tank 40. Although not shown in detail, the ozone generator 50 may include an electrode tube (not shown), and the electrode tube may generate ozone through electrolysis of oxygen by applying a certain amount of current to oxygen introduced from the oxygen receiver tank 40. The ozone generator 50 may supply the generated ozone to the ozone injector (INJECT).

The ozone generator gas valve (VV1) may be installed in the oxygen line between the oxygen receiver tank 40 and the ozone generator 50. The ozone generator gas valve (VV1) may control the flow rate of oxygen supplied to the ozone generator 50.

A bypass line through which oxygen output from the oxygen receiver tank 40 bypasses the ozone generator 50 may be formed. The bypass line may send oxygen supplied from the oxygen receiver tank 40 to the output terminal of the ozone generator 50 so that the oxygen bypasses the ozone generator 50. The bypass valve (VV2) for controlling the flow rate of the ozone generator bypass line may be installed in the bypass line.

The oxygen receiver tank 40 and the ozone generator 50 may constitute a modular ozone unit.

The ozone output valve (VV3) for controlling the flow rate of ozone generated from the ozone generator 50 may be installed in an ozone line connecting the ozone generator 50 and the ozone injector (INJECT). The third pressure gauge (PT03) may be installed in the ozone line. The third pressure gauge (PT03) may measure the pressure of a fluid output from the ozone generator.

The controller 60 may receive pressure signals measured in the first to third pressure gauges (PT01, PT02, and PT03), and may control opening and closing of the ozone generator gas valve (VV1), the bypass valve (VV2), and the ozone output valve (VV3).

The ballast water pump 70 may pump ballast water and provide the ballast water to the inflow line (LINE1).

The inflow line (LINE1) may transfer ballast water from the ballast water pump 70 to the ballast water tank 80.

The ballast water tank 80 may receive ballast water from the inflow line (LINE1) and store the ballast water.

The ozone injector (INJECT) may inject ozone supplied through the ozone line into the ballast water of the inflow line (LINE1).

Ballast water stored in the ballast water tank 80 may be discharged through the discharge line (LINE2).

The neutralization device 90 may supply a neutralizing agent to the discharge line (LINE2) to neutralize residual active materials contained in ballast water discharged through the discharge line (LINE2).

In addition, the ballast water treatment system may further include a filter for seawater (FIL) installed in the inflow line (LINE1). The filter for seawater (FIL) installed in the inflow line (LINE1) may purify ballast water supplied from the ballast water pump 70.

Figure 2:
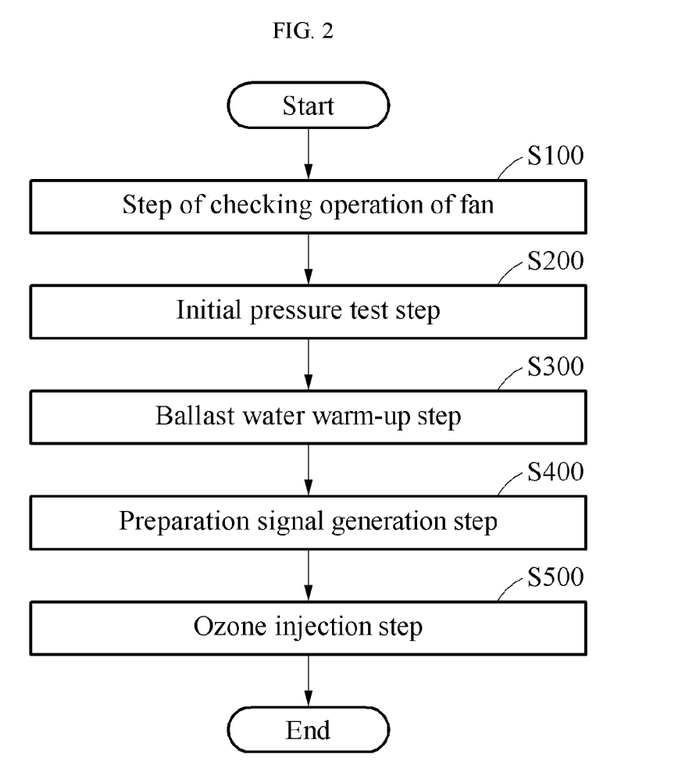
FIG. 2 is a flowchart for explaining the method of driving a ballast water treatment system shown in FIG. 1.

FIG. 2 is a flowchart for explaining the method of driving a ballast water treatment system shown in FIG. 1.

Referring to FIGS. 1 and 2, the ballast water treatment system may include an air compressor for compressing air, an air receiver tank for storing the compressed air, an oxygen generator for generating oxygen from the air, an oxygen receiver tank for storing the oxygen, an ozone generator for generating ozone from the oxygen, a ballast water pump for pumping ballast water, an inflow line for transferring the ballast water, an ozone injector for injecting the ozone into the inflow line, and a fan for ventilating the surroundings of the components.

The ballast water treatment system further include a first pressure gauge for measuring the pressure of a fluid output from the air receiver tank, a second pressure gauge for measuring the pressure of a fluid output from the oxygen receiver tank, a third pressure gauge for measuring the pressure of a fluid output from the ozone generator, an ozone generator gas valve for controlling the flow rate of the oxygen supplied from the oxygen receiver tank to the ozone generator, an ozone output valve for controlling the flow rate of the ozone supplied from the ozone generator to the inflow line, and a bypass valve for controlling the flow rate of an ozone generator bypass line that sends the oxygen supplied from the oxygen receiver tank to the output terminal of the ozone generator so that the oxygen bypasses the ozone generator.

The ballast water treatment system may further include a ballast water tank for receiving the ballast water from the inflow line and storing the ballast water; a discharge line for discharging the ballast water stored in the ballast water tank; and a neutralization device for providing a neutralizing agent to the discharge line.

The method of driving a ballast water treatment system may include step S100 of checking operation of a fan, initial pressure test step S200, ballast water warm-up step S300, preparation signal generation step S400, and ozone injection step S500.

In step S100 of checking operation of a fan, it is checked whether a fan for ambient ventilation of the ballast water treatment system is operating. When treating ballast water, harmful gases, especially ozone, may be discharged. To prevent this, the fan for ventilation may be operated in advance. When operation of the fan is checked, the next step may proceed.

In initial pressure test step S200, the output pressure of the ozone generator 50 may be tested using oxygen. Since ozone is a harmful gas, before ozone is generated, it is confirmed whether generation of ozone using oxygen is ready. When there is no defect in initial pressure test step S200, the next step may proceed.

In ballast water warm-up step S300, ozone may be generated using the ozone generator 50. When there is no defect in ballast water warm-up step S300, the next step may proceed.

In preparation signal generation step S400, it may be notified that ozone is ready to be injected into ballast water. When a controller notifies that ozone is ready to be injected into ballast water, ozone injection step S500 of injecting ozone into ballast water of the inflow line may be performed.

In this case, the amount of the ozone injected into the ballast water may be maintained at 2.2 ppm to 2.5 ppm.

In addition, the ballast water treatment system may further include a filter for seawater installed in the inflow line. The filter for seawater may be installed in the inflow line to purify ballast water supplied from the ballast water pump. The method of driving a ballast water treatment system may further include, before ozone injection step S500, a step of purifying, using the filter for seawater, ballast water supplied from the ballast water pump. As described above, by first purifying ballast water using the filter for seawater before injecting ozone, the injection amount of ozone may be reduced, or the sterilization and purification efficiency of seawater may be improved.

Figure 3:
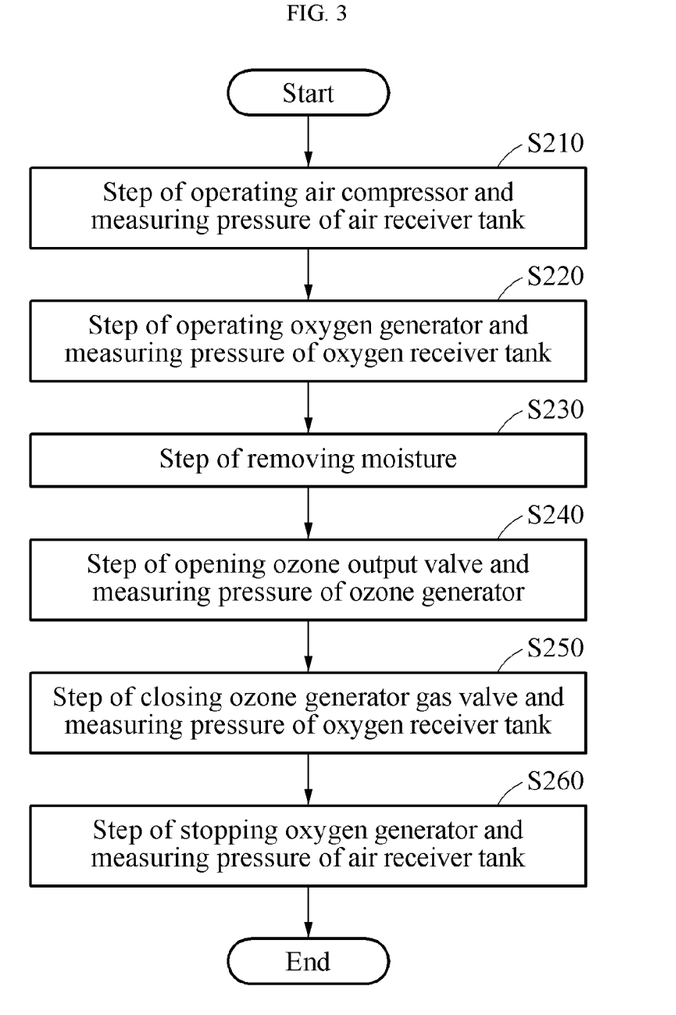
FIG. 3 is a flowchart for explaining the initial pressure test step of the method of driving a ballast water treatment system shown in FIG. 2.

FIG. 3 is a flowchart for explaining the initial pressure test step of the method of driving a ballast water treatment system shown in FIG. 2.

Referring to FIG. 3, initial pressure test step S200 may include step S210 of operating the air compressor and measuring the pressure of the air receiver tank, step S220 of operating the oxygen generator and measuring the pressure of the oxygen receiver tank, step S230 of removing moisture, step S240 of opening the ozone output valve and measuring the pressure of the ozone generator, step S250 of closing the ozone generator gas valve and measuring the pressure of the oxygen receiver tank, and step S260 of stopping the oxygen generator and measuring the pressure of the air receiver tank.

In step S210 of operating the air compressor and measuring the pressure of the air receiver tank, the air compressor may be operated, and a first (a) pressure of air output from the air receiver tank may be measured using the first pressure gauge. When the measured first (a) pressure is within a preset range, the next step may proceed. The preset value of the first (a) pressure may be 7 bar. The preset range may be a range including the preset value and a measurement error range.

In step S220 of operating the oxygen generator and measuring the pressure of the oxygen receiver tank, the oxygen generator may be operated, and a second (a) pressure of oxygen output from the oxygen receiver tank may be measured using the second pressure gauge. When the measured second (a) pressure is within a preset range, the next step may proceed. The preset value of the second (a) pressure may be 3.5 bar. The preset range may be a range including the preset value and a measurement error range.

In step S230 of removing moisture, moisture of oxygen supplied to the ozone generator may be removed. When oxygen including moisture is supplied to the ozone generator, the ozone generator may not work properly. Thus, moisture is preferably removed from oxygen to be supplied to the ozone generator.

In step S240 of opening the ozone output valve and measuring the pressure of the ozone generator, the ozone output valve may be opened but the ozone generator may not be operated, and a third pressure of oxygen passing through the ozone generator and output from the ozone generator may be measured using the third pressure gauge. When the measured third pressure is within a preset range, the next step may proceed. The preset value of the third pressure may be 1.2 bar. The preset range may be a range including the preset value and a measurement error range.

In step S250 of closing the ozone generator gas valve and measuring the pressure of the oxygen receiver tank, the ozone generator gas valve may be closed, and a second (b) pressure of oxygen output from the oxygen receiver tank may be measured using the second pressure gauge. When the measured second (b) pressure is within a preset range, the next step may proceed. The preset value of the second (b)

pressure may be 3.5 bar. The preset range may be a range including the preset value and a measurement error range.

In step S260 of stopping the oxygen generator and measuring the pressure of the air receiver tank, the oxygen generator may be stopped, and a first (b) pressure of air output from the air receiver tank may be measured. When the measured first (b) pressure is within a preset range, the next step may proceed. The preset value of the first (b) pressure may be 7 bar. The preset range may be a range including the preset value and a measurement error range.

The first (a) pressure and the first (b) pressure may be the same, the second (a) pressure and the second (b) pressure may be the same, the first (a) pressure may be greater than the second (a) pressure, and the second (a) pressure may be greater than the third pressure.

Figure 4:
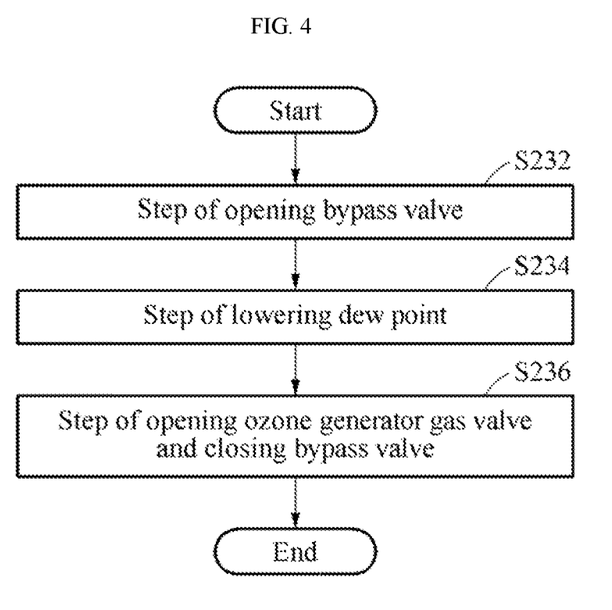
FIG. 4 is a flowchart for explaining the moisture removal step of the initial pressure test step of the method of driving a ballast water treatment system shown in FIG. 3.

FIG. 4 is a flowchart for explaining the moisture removal step of the initial pressure test step of the method of driving a ballast water treatment system shown in FIG. 3.

Referring to FIG. 4, step S230 of removing moisture may include step S232 of opening a bypass valve, step S234 of lowering a dew point, and step S236 of opening an ozone generator gas valve and closing a bypass valve.

In step S232 of opening a bypass valve, the bypass valve may be opened to allow oxygen to flow into the bypass line.

In step S234 of lowering a dew point, oxygen is allowed to flow into the bypass line and a dew point is lowered to condense moisture of the oxygen, thereby removing moisture.

In step S236 of opening an ozone generator gas valve and closing a bypass valve, the ozone generator gas valve may be opened, and the bypass valve may be closed.

Figure 5:
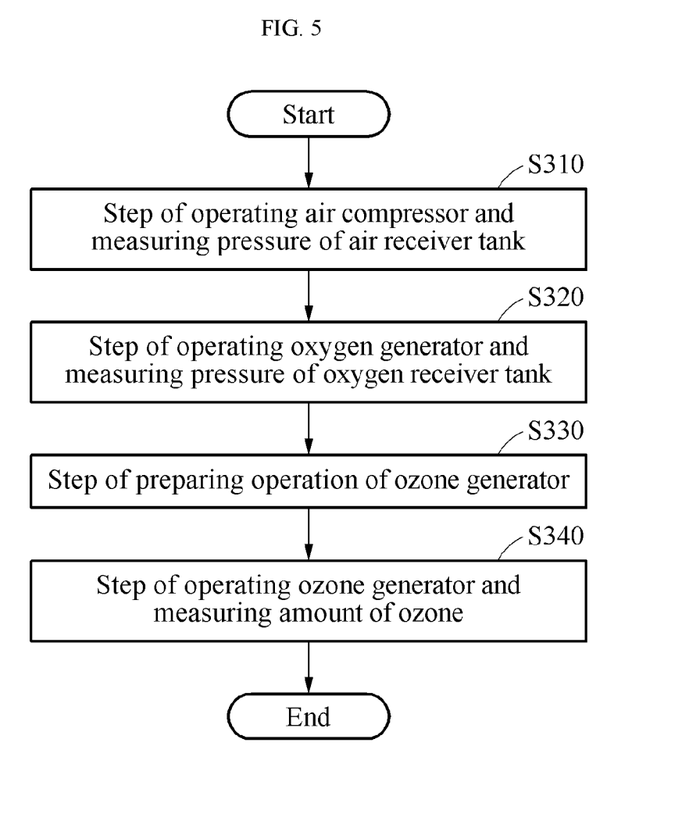
FIG. 5 is a flowchart for explaining the ballast water warm-up step of the method of driving a ballast water treatment system shown in FIG. 2.

FIG. 5 is a flowchart for explaining the ballast water warm-up step of the method of driving a ballast water treatment system shown in FIG. 2.

Referring to FIG. 5, the ballast water warm-up step S300 may include step S310 of operating an air compressor and measuring the pressure of an air receiver tank, step S320 of operating an oxygen generator and measuring the pressure of an oxygen receiver tank, step S330 of preparing operation of an ozone generator, and step S340 of operating an ozone generator and measuring the amount of ozone.

In step S310 of operating an air compressor and measuring the pressure of an air receiver tank, the air compressor may be operated, and a first pressure of air output from the air receiver tank may be measured using the first pressure gauge. When the measured first pressure is within a preset range, the next step may proceed. The preset value of the first pressure may be 7 bar. The preset range may be a range including the preset value and a measurement error range.

In step S320 of operating an oxygen generator and measuring the pressure of an oxygen receiver tank, the oxygen generator may be operated, and a second pressure of oxygen output from the oxygen receiver tank may be measured using the second pressure gauge. When the measured second pressure is within a preset range, the next step may proceed. The preset value of the second pressure may be 3.5 bar. The preset range may be a range including the preset value and a measurement error range.

In step S330 of preparing operation of an ozone generator, before the ozone generator is operated, it may be confirmed whether moisture is sufficiently removed from oxygen to be supplied to the ozone generator.

In step S340 of operating an ozone generator and measuring the amount of ozone, the ozone generator may be operated, and the concentration of ozone output from the ozone generator may be measured. When the measured concentration of ozone is within a predetermined range, the next step may proceed. The preset value of the concentration of ozone may be 100 g/Nm3. Considering an error range, the predetermined range may be 100±10 g/Nm3.

Figure 6:
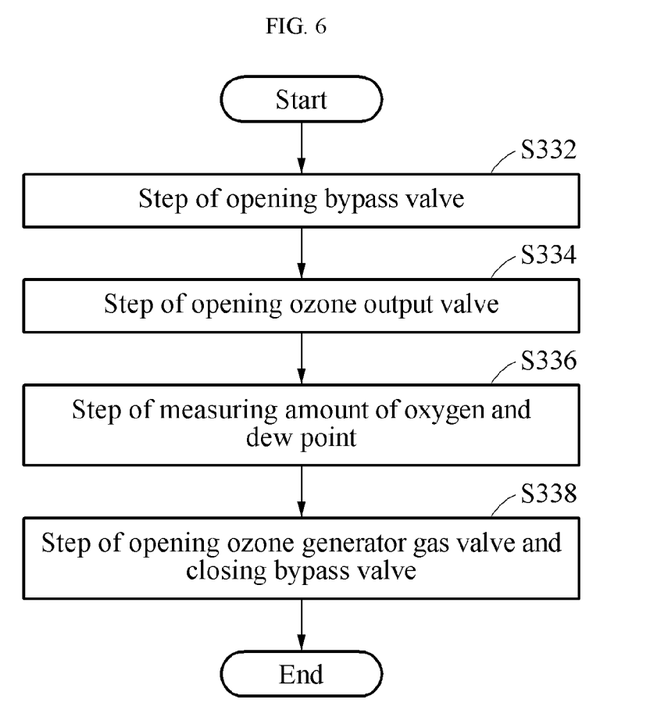
FIG. 6 is a flowchart for explaining the step of preparing operation of an ozone generator of the ballast water warm-up step of the method of driving a ballast water treatment system shown in FIG. 5.

FIG. 6 is a flowchart for explaining the step of preparing operation of an ozone generator of the ballast water warm-up step of the method of driving a ballast water treatment system shown in FIG. 5.

Step S330 of preparing operation of an ozone generator may include step S332 of opening a bypass valve, step S334 of opening an ozone output valve, step S336 of measuring the amount of oxygen and a dew point, and step S338 of opening an ozone generator gas valve and closing a bypass valve.

In step S332 of opening a bypass valve, the bypass valve may be opened to allow oxygen to flow into the bypass line.

In step S334 of opening an ozone output valve, the ozone output valve may be opened to allow oxygen to pass through the ozone output valve through the bypass line.

In step S336 of measuring the amount of oxygen and a dew point, the concentration of oxygen passing through the bypass line and a dew point may be measured.

When the measured concentration of oxygen and the measured value of a dew point are respectively within a preset range, the next step may proceed. The preset range of the concentration of oxygen may be 85% or more, and the preset range of a dew point may be −40° C. or less.

In step S338 of opening an ozone generator gas valve and closing a bypass valve, the ozone generator gas valve may be opened, and the bypass valve may be closed.

In addition, the method of driving a ballast water treatment system may further include a step of supplying the neutralizing agent to the discharge line to neutralize residual active materials contained in the ballast water discharged through the discharge line.

According to embodiments of the present invention, the ballast water treatment system includes an air compressor, an air receiver tank, an oxygen generator, an oxygen receiver tank, an ozone generator, a ballast water pump, an inflow line, a ballast water tank, and an ozone injector. The method of driving the ballast water treatment system includes a step of checking operation of a fan, an initial pressure test step, a ballast water warm-up step, a preparation signal generation step, and a step of injecting ozone into ballast water of the inflow line (ozone injection step). When a specific condition is not satisfied in each step, a subsequent step for each step is not performed. Accordingly, efficient and safe ozone management may be possible.

In addition, the pressure of a specific location, a dew point, and the like are measured. Based on the measured results, only when the measured results are within a preset range, subsequent steps are performed, and ozone is generated. Accordingly, outflow of harmful ozone gas may be prevented.

Although the present invention has been described above with reference to the embodiments of the present invention, those skilled in the art may variously modify and change the present invention without departing from the spirit and scope of the present invention as set forth in the claims below.

The invention claimed is:
1. A ballast water treatment system, comprising:
an air compressor for compressing air;
an air receiver tank for receiving the compressed air from the air compressor and storing the compressed air;
an oxygen generator for generating oxygen from air supplied from the air receiver tank;

an oxygen receiver tank for storing oxygen supplied from the oxygen generator;
an ozone generator for generating ozone from the oxygen supplied from the oxygen receiver tank;
a ballast water pump for pumping ballast water;
an inflow line for transferring the ballast water from the ballast water pump;
a ballast water tank for receiving the ballast water from the inflow line and storing the ballast water; and
an ozone injector for injecting the ozone into the ballast water of the inflow line,
wherein the ballast water treatment system further comprises:
an oxygen line installed between the oxygen receiver tank and the ozone generator;
an ozone line installed between the ozone generator and the ozone injector;
an ozone generator gas valve installed in the oxygen line for controlling a flow rate of the oxygen supplied from the oxygen receiver tank to the ozone generator;
a bypass line connected to the oxygen line and the ozone line and sending the oxygen supplied from the oxygen receiver tank to the ozone line so that the oxygen bypasses the ozone generator;
a bypass valve installed in the bypass line for controlling a flow rate of the bypass line that sends the oxygen supplied from the oxygen receiver tank to the ozone line; and
an ozone output valve installed in the ozone line for controlling a flow rate of the ozone generated in the ozone generator.

2. The ballast water treatment system according to claim 1, further comprising:
a first pressure gauge for measuring a pressure of a fluid output from the air receiver tank;
a second pressure gauge for measuring a pressure of a fluid output from the oxygen receiver tank; and
a third pressure gauge for measuring a pressure of a fluid output from the ozone generator.

3. The ballast water treatment system according to claim 2, further comprising a controller for receiving pressure signals measured in the first to third pressure gauges and controlling opening and closing of the ozone generator gas valve, the bypass valve, and the ozone output valve.

4. The ballast water treatment system according to claim 1, further comprising:
a discharge line for discharging the ballast water stored in the ballast water tank; and
a neutralization device for supplying a neutralizing agent to the discharge line to neutralize residual active materials contained in the ballast water discharged through the discharge line.

5. The ballast water treatment system according to claim 1, further comprising a filter for seawater installed in the inflow line to purify the ballast water supplied from the ballast water pump.

6. A method of driving a ballast water treatment system comprising an air compressor for compressing air; an air receiver tank for storing the compressed air; an oxygen generator for generating oxygen from the compressed air; an oxygen receiver tank for storing the oxygen; an ozone generator for generating ozone from the oxygen; a ballast water pump for pumping ballast water; an inflow line for transferring the ballast water; an ozone injector for injecting the ozone into the inflow line; and a fan for ventilation of the ballast water treatment system, the method comprising:
a step of checking operation of the fan;
a step of testing an output pressure of the ozone generator using the oxygen (initial pressure test step);
a step of generating ozone using the ozone generator (ballast water warm-up step);
a step of notifying that the ozone is ready to be injected into the ballast water (preparation signal generation step) based on a result of the ballast water warm-up step; and
a step of injecting the ozone into the ballast water of the inflow line (ozone injection step),
wherein the ballast water treatment system further comprises:
an oxygen line installed between the oxygen receiver tank and the ozone generator;
an ozone line installed between the ozone generator and the ozone injector;
an ozone generator gas valve installed in the oxygen line for controlling a flow rate of the oxygen supplied from the oxygen receiver tank to the ozone generator;
a bypass line connected to the oxygen line and the ozone line and sending the oxygen supplied from the oxygen receiver tank to the ozone line so that the oxygen bypasses the ozone generator;
a bypass valve installed in the bypass line; and
an ozone output valve installed in the ozone line, and
wherein the ballast water warm-up step comprises:
a step of opening the bypass valve to allow the oxygen supplied from the oxygen receiver tank to pass through the ozone output valve via the bypass line;
a step of measuring a concentration of the oxygen passing through the bypass line and a dew point; and
a step of opening the ozone generator gas valve and closing the bypass valve based on the measured concentration of the oxygen being in a first preset range and the measured dew point being in a second preset range.

7. The method according to claim 6, wherein the ballast water treatment system further comprises a first pressure gauge for measuring a pressure of a fluid output from the air receiver tank; a second pressure gauge for measuring a pressure of a fluid output from the oxygen receiver tank; a third pressure gauge for measuring a pressure of a fluid output from the ozone generator; an ozone generator gas valve for controlling a flow rate of the oxygen supplied from the oxygen receiver tank to the ozone generator; and an ozone output valve for controlling a flow rate of the ozone supplied from the ozone generator to the inflow line, and
the initial pressure test step comprises a step of operating the air compressor and measuring, using the first pressure gauge, a first (a) pressure of air output from the air receiver tank; a step of operating the oxygen generator and measuring, using the second pressure gauge, a second (a) pressure of oxygen output from the oxygen receiver tank; a step of removing moisture of the oxygen (moisture removal step); a step of opening the ozone output valve but not operating the ozone generator, and measuring, using the third pressure gauge, a third pressure of the oxygen passing through the ozone generator and output from the ozone generator; a step of closing the ozone generator gas valve and measuring, using the second pressure gauge, a second (b) pressure of the oxygen output from the oxygen receiver tank; and a step of stopping the oxygen generator and measuring a first (b) pressure of the air output from the air receiver tank.

8. The method according to claim 7, wherein, only when values of the first (a) pressure, the second (a) pressure, the third pressure, the second (b) pressure, and the first (b) pressure are respectively within a preset range, the initial pressure test step is completed, and the ballast water warm-up step is performed.

9. The method according to claim 8, wherein the preset range of the first (a) pressure and the preset range of the first (b) pressure are identical to each other, the preset range of the second (a) pressure and the preset range of the second (b) pressure are identical to each other, the preset range of the first (a) pressure is greater than the preset range of the second (a) pressure, and the preset range of the second (a) pressure is greater than the preset range of the third pressure.

10. The method according to claim 7,
wherein the moisture removal step comprises a step of opening the bypass valve; a step of allowing the oxygen to flow into the bypass line and lowering a dew point to condense moisture of the oxygen (dew point lowering step); and a step of opening the ozone generator gas valve and closing the bypass valve.

11. The method according to claim 10, wherein the ballast water warm-up step comprises a step of operating the air compressor and measuring, using the first pressure gauge, a first pressure of the air output from the air receiver tank; a step of operating the oxygen generator and measuring, using the second pressure gauge, a second pressure of the oxygen output from the oxygen receiver tank; and a step of operating the ozone generator and measuring a concentration of ozone output from the ozone generator.

12. The method according to claim 6, wherein the first preset range of the concentration of the oxygen is 85% or more, and the second preset range of the dew point is −40° C. or less.

13. The method according to claim 6, wherein an amount of the ozone injected into the ballast water is maintained at 2.2 ppm to 2.5 ppm.

14. The method according to claim 6, wherein the ballast water treatment system further comprises a ballast water tank for receiving the ballast water from the inflow line and storing the ballast water; a discharge line for discharging the ballast water stored in the ballast water tank; and a neutralization device for providing a neutralizing agent to the discharge line, and
the method further comprises a step of supplying the neutralizing agent to the discharge line to neutralize residual active materials contained in the ballast water discharged through the discharge line.

15. The method according to claim 6, wherein the ballast water treatment system further comprises a filter for seawater installed in the inflow line, and
the method further comprises, before the ozone injection step, a step of purifying, using the filter for seawater, the ballast water supplied from the ballast water pump.

* * * * *